US 9,204,329 B2

(12) United States Patent
Boyle et al.

(10) Patent No.: US 9,204,329 B2
(45) Date of Patent: Dec. 1, 2015

(54) DISTRIBUTED RAN INFORMATION COLLECTION, CONSOLIDATION AND RAN-ANALYTICS

(71) Applicant: Movik Networks, Westford, MA (US)

(72) Inventors: Charles W. Boyle, Upton, MA (US); Surya Kumar Kovvali, Westboro, MA (US); John Hutchins, Groton, MA (US); Tarek Abou-Assali, Boston, MA (US); Mythili Vutukuru, Secunderabad, A.P. (IN); Keith Spinney, Medway, MA (US); Nitin Rana, Bangalore (IN); Gopal K. Bonthu, North Grafton, MA (US)

(73) Assignee: Movik Networks, Westford, MA (US)

( * ) Notice: Subject to any disclaimer, the term of this patent is extended or adjusted under 35 U.S.C. 154(b) by 141 days.

(21) Appl. No.: 13/858,473

(22) Filed: Apr. 8, 2013

(65) Prior Publication Data
US 2013/0258865 A1 Oct. 3, 2013

Related U.S. Application Data

(63) Continuation of application No. 13/555,787, filed on Jul. 23, 2012, now Pat. No. 8,908,507.

(60) Provisional application No. 61/621,318, filed on Apr. 6, 2012, provisional application No. 61/510,217, filed on Jul. 21, 2011, provisional application No. 61/561,538, filed on Nov. 18, 2011, provisional application No. 61/621,031, filed on Apr. 6, 2012.

(51) Int. Cl.
*H04W 24/10* (2009.01)
*H04W 24/08* (2009.01)
*H04W 88/18* (2009.01)

(52) U.S. Cl.
CPC ............. *H04W 24/10* (2013.01); *H04W 24/08* (2013.01); *H04W 88/18* (2013.01)

(58) Field of Classification Search
CPC ..... H04L 43/04; H04L 41/0813; H04L 41/12; H04L 43/08; H04L 43/10; H04W 28/02; H04W 28/06; H04W 28/065; H04W 28/10; H04W 28/12; H04W 28/14; H04W 28/16; H04W 28/18; H04W 24/02; H04W 24/08; H04W 24/10; H04W 88/18
USPC ......... 370/252, 241, 311, 389, 250, 312, 465, 370/236, 474, 254, 230, 432, 310.2, 310, 370/338, 410, 392, 346, 235; 709/247, 709/223–226
See application file for complete search history.

(56) References Cited

U.S. PATENT DOCUMENTS 6,661,778 B1 * 12/2003 Trofin et al. .................. 370/252
7,197,067 B2    3/2007 Lusky et al.

(Continued)

OTHER PUBLICATIONS

International Search Report/Written Opinion mailed Oct. 16, 2012 in co-pending PCT application No. PCT/US 12/47851.

(Continued)

*Primary Examiner* — Kwang B Yao
*Assistant Examiner* — Ricardo Castaneyra
(74) *Attorney, Agent, or Firm* — Nields, Lemack & Frame, LLC

(57) ABSTRACT

Control Plane and User plane packet data are collected within the Radio Access Network using a plurality of network devices. Consolidation and summarization of this information is then performed to present a unified picture of RAN through abstract APIs to management and analytics applications. The invention identifies methods of retaining the collected network data, such as control and application protocol headers at the collection points, and consolidation and exporting this network data to management/reporting/analytics application using application driven rules for consolidation and summarization. Real-time statistical analysis tools, which may be used to predict failure and degradation trends and proactively control the underlying causes, are also disclosed.

8 Claims, 9 Drawing Sheets

(56) References Cited

U.S. PATENT DOCUMENTS

| | | | |
|---|---|---|---|
| 7,590,427 B2 | 9/2009 | Villwock et al. | |
| 7,609,650 B2 * | 10/2009 | Roskowski et al. | 370/252 |
| 7,843,829 B1 | 11/2010 | Truong et al. | |
| 7,864,727 B2 | 1/2011 | Inayoshi et al. | |
| 8,023,419 B2 * | 9/2011 | Oran | 370/250 |
| 8,111,630 B2 | 2/2012 | Kovvali et al. | |
| 8,208,430 B2 | 6/2012 | Valmikam et al. | |
| 8,565,076 B2 | 10/2013 | Kovvali et al. | |
| 8,576,744 B2 | 11/2013 | Kovvali et al. | |
| 8,908,507 B2 | 12/2014 | Kovvali et al. | |
| 2003/0095526 A1 | 5/2003 | Froehlich et al. | |
| 2004/0233851 A1 * | 11/2004 | Baldwin et al. | 370/241 |
| 2005/0213511 A1 * | 9/2005 | Reece et al. | 370/252 |
| 2006/0193289 A1 | 8/2006 | Ronneke et al. | |
| 2006/0194599 A1 | 8/2006 | Villwock et al. | |
| 2007/0153689 A1 * | 7/2007 | Strub et al. | 370/230 |
| 2007/0293235 A1 | 12/2007 | Inayoshi et al. | |
| 2008/0141072 A1 | 6/2008 | Kalgren et al. | |
| 2008/0244095 A1 | 10/2008 | Vos et al. | |
| 2008/0311855 A1 | 12/2008 | Manousakis et al. | |
| 2009/0270098 A1 | 10/2009 | Gallagher et al. | |
| 2009/0274161 A1 | 11/2009 | Liu | |
| 2010/0034089 A1 | 2/2010 | Kovvali et al. | |
| 2010/0034218 A1 | 2/2010 | Kovvali et al. | |
| 2010/0195602 A1 | 8/2010 | Kovvali et al. | |
| 2010/0248638 A1 | 9/2010 | Harada et al. | |
| 2010/0291943 A1 | 11/2010 | Mihaly et al. | |
| 2011/0136488 A1 | 6/2011 | Kovvali et al. | |
| 2011/0201305 A1 | 8/2011 | Buer et al. | |
| 2012/0076120 A1 | 3/2012 | Kovvali et al. | |
| 2012/0077500 A1 | 3/2012 | Shaheen | |
| 2012/0082146 A1 | 4/2012 | Andreason et al. | |
| 2012/0099533 A1 | 4/2012 | Kovvali et al. | |
| 2012/0120788 A1 | 5/2012 | Hu | |
| 2012/0142335 A1 * | 6/2012 | Chiou et al. | 455/423 |
| 2012/0184258 A1 | 7/2012 | Kovvali et al. | |
| 2012/0220328 A1 | 8/2012 | Yu et al. | |
| 2013/0021928 A1 | 1/2013 | Weill et al. | |
| 2013/0021933 A1 | 1/2013 | Kovvali et al. | |
| 2013/0072222 A1 | 3/2013 | Weill et al. | |
| 2013/0143542 A1 | 6/2013 | Kovvali et al. | |
| 2013/0235845 A1 | 9/2013 | Kovvali et al. | |
| 2014/0016509 A1 | 1/2014 | Kovvali et al. | |
| 2014/0056137 A1 | 2/2014 | Kovvali et al. | |

OTHER PUBLICATIONS

3GPP TS 23.203, V12.0.0 (Mar. 2013), Technical Specification, 3rd Generation Partnership Project; Technical Specification Group Services and System Aspects; Policy and charging control architecture (Release 12), 183 pages.

3GPP TS 29.212, V 12.0.0 (Mar. 2013), Technical Specification, 3rd Generation Partnership Project; Technical Specification Group Core Network and Terminals; Policy and Charging Control (PCC); Reference Points (Release 12), 198 pages.

Office Action mailed Sep. 12, 2014 in co-pending U.S. Appl. No. 13/679,458.

Notice of Allowance mailed Jan. 30, 2015 in co-pending U.S. Appl. No. 13/679,458.

Office Action mailed Aug. 26, 2014 in co-pending U.S. Appl. No. 14/071,009.

Notice of Allowance mailed Jan. 23, 2015 in co-pending U.S. Appl. No. 14/071,009.

Office Action—Restriction—mailed Dec. 26, 2013 in co-pending U.S. Appl. No. 13/183,777.

Office Action mailed May 23, 2014 in co-pending U.S. Appl. No. 13/183,777.

Final Rejection mailed Jan. 20, 2015 in co-pending U.S. Appl. No. 13/183,777.

* cited by examiner

DISTRIBUTED RAN INFORMATION COLLECTION, CONSOLIDATION AND RAN-ANALYTICS

This application is a continuation in part of U.S. patent application Ser. No. 13/555,787, filed Jul. 23, 2012, which claims priority to U.S. Provisional Patent Application Ser. Nos. 61/510,217, filed Jul. 21, 2011, 61/561,538, filed Nov. 18, 2011, and 61/621,031, filed Apr. 6, 2012. This application also claims priority of U.S. Provisional Patent Application Ser. No. 61/621,318, filed Apr. 6, 2012, the disclosures of which are incorporated by reference in their entireties.

BACKGROUND OF THE INVENTION

Telecommunication Operators use a number of systems to manage, monitor and optimize their network including Element Management Systems (EMSs), Network Management Systems (NMSs), Operational Service Systems (OSSs), Policy Charging Rules Function (PCRF), Policy Charging Enforcement Function (PCEF), Deep Packet Inspection (DPI) devices, and Network Probes.

FIG. 1 depicts a 3GPP Long-term Evolution Network separated by management plane 10, enhanced packet core network 20, and radio access network 30. Traditionally, network management resides in the management plane 10 represented by EMSs, NMS, and OSS, which would monitor and control network elements (e.g. PGWs, SGWs, MMEs, eNodeBs, and PE routers) through out-of-band management channel represented by dotted lines in FIG. 1. EMSs are used to manage particular vendor equipment, or class of equipment. NMS and OSS are used to roll-up different EMS views, and provide an environment to capture operational, administrative, management, and provisioning (OAMP) work flows, respectively. These workflows usually fall into one or more of the following categories: Fault Management, Configuration Management, Accounting, and Performance Management. Fault management is used to highlight immediate problems in a network through stateful or threshold crossing alarms. Configuration Management is used to enable, disable or modify functionality across one or more network elements (e.g. PGW, SGW, or eNodeB). Accounting Management is used to track the billing activity of operator's customers. Performance management is used to measure current network health, and provide the necessary visibility into growth.

The OSS/NMS/EMS system is used for fault isolation and resolution, determining whether system performance is declining, upgrading or deploying additional resources, or monitoring consumption of the network.

Over time, other systems were introduced to provide further visibility and control in the network including Network Probes, Deep Packet Inspection devices, Policy Charging Rule Functions (PCRFs) and Policy Charging Enforcement Functions (PCEFs). FIG. 2 illustrates the addition of 3GPP Policy Charging & Control (PCC) Architecture, which transcends the management plane 10 by introducing devices into the control and user plane as enforcement functions. This extends network management driven by OSS, to include control down to subscriber and subscriber's application level. This process was achieved by defining functions for collection, rule analysis and enforcement. The collection and enforcement functions may be centralized or distributed but the rules functions are centralized. The policy driven process works as follows: (1) analyze network and subscriber behavior by taking in data from Network Probes and DPIs, (2) determine policy threshold matching rules and enforcements in the PCRF and PCEF, (3) deploy rules, and (4) enforce actions when thresholds are reached. Due to the centralized nature of this function it only scales well for certain applications and requires the introduction of 3GPP Diameter Routers (DRs) as a front-end load balancer to the PCRFs from all of the various PCEFs such as optimization platforms, core mobile network elements, RAN mobile network elements and deep packet inspection devices.

FIG. 3 illustrates a more recent approach to use offline Analytics to manage the overwhelming amount of data collected by EMSs, NMSs/OSSs, Network Probes, DPI devices, PCEFs, PCRFs, and logging from a multitude of network elements and systems that do not fall into the previous mentioned network devices. Using this data, the network operator is able to move all of the data into a database, usually after several layers of transformations, to get a better understanding of the current network and trends (descriptive analytics) and/or use the past history and trending to determine what may happen in the future (predictive analytics). This means extracting the data, transforming the data into something manageable/consumable, and loading the data into a database for online/offline processing.

When a user initiates connectivity with a mobile network, the user's device (UE) first establishes a signaling connection through the RAN with the mobile network, and establishes Radio Access Bearer (RAB) for transferring user data from/to the user through the RAN, Mobile Core Network (CN) to the internet. Such RABs are established and removed within the RAN on a need basis to conserve Radio and Network Resources. Establishing and removal of RABs is not visible outside of the RAN and thus invisible to the devices beyond the operator's RAN. User's behavior and experience while accessing internet content through the Mobile Network, and the mobile network and RAN behavior as a number of user applications access the network is dependent on types of applications, coverage area and channel quality provided by the RAN to the user applications, time of day, congestion points within the network, device characteristics, mobile device operating system and application versions and so on.

For example, to determine, correct (or prevent) frequent loss of connectivity to the network, several dimensions need to be considered before it can be isolated to the RF conditions of the home area network or a recent device OS upgrade, where nearly all of these aspects are outside the scope of the RAN.

These aspects are not visible by the prior art in part, or in whole, due to the volume of data, tight timing constraints, and combinations of data elements and KPIs. Prior art data collection, analytics and reporting methods collect user data at several locations, import the data to a central database, and then run analysis tools to identify behavior of users, behavior of sites, behavior of devices, trending reports etc.

The prior art is inherently open loop and follows a common architectural principle of collecting known data to a central database or repository, analyzing or processing centralized data based on rigid definition, and performing corresponding fixed actions based on that centralized view. The prior art lacks the ability to inspect large amounts of fine-grained data (e.g. inter-packet gap between messages), with low latency (e.g. 1-10 seconds), and allow the flexibility to introduce new relationships (for example dynamic methods by which data reduction and database importing methods are driven by analytics/reporting queries).

The current invention identifies storing the correlated data from multiple protocols in unstructured form to retain the majority of the information that is envisioned to be needed, running reduction methods on portions of distributed data (inter-related protocol data from different network elements), and running additional reduction methods supplied by Analysis and Reporting Node (ARN) on a demand basis at the data collection points (DNs), and then importing to database. The database may be centrally located close to the ARN node, or layered on a distributed file system that is spread between the ARN and DN nodes. These methods of importing data into a database are known in the prior art and outside the scope of the current invention. The current invention enables a class of application use cases by aligning the computation model with the underlying network structure while still managing the overall amount of data. Another embodiment of the current invention is "closed loop analytics", that includes (1) exporting additional fine-grain data already collected in the DNs on a need basis by detecting anomalies and threshold crossing on performance metrics from plurality of DNs, for example, a number of eNodeB's covering a venue, or airport, (2) exporting methods and procedures to collect additional fine-grain data which were not previously incorporated into the device previously, (3) exporting methods and procedures to reduce the newly collected data together with the remaining data to derive new consolidated metrics and/or minimize the amount of data to be exported. These fine-grain drill-down collection and analysis methods may be automatically invoked by the ARN based on the network-wide anomaly detection, and/or operator initiated query.

SUMMARY

The current invention identifies methods and procedures for correlating control plane, user plane, management plane and other tangential inputs in real-time that are logically and geographically distributed throughout a Mobile Network including (1) a plurality of network devices, (2) various Control Plane, User Plane and Management Plane protocols from Radio Access Networks including UMTS, CDMA, LTE, WIMAX, and WIFI, (3) various service technologies including voice, broadband data access, messaging services, and video, (4) functions such as network operations, network planning, customer care, marketing and general research, (5) and a number of other dimensions including time, device, applications, domains, network elements, network hierarchies, among other categories. The data for this correlation may be collected by intercepting or monitoring physical or logical interfaces as identified in commonly owned U.S. Pat. No. 8,111,630 and U.S. Patent Publication 2013-0021933, which are incorporated by reference in their entireties, or may be imported from other network elements in protocol form or logging (e.g. PCMD) such as eNodeB, MME, SGW, RNS, SGSN, PCRF, SON Server etc., in the operator mobile network.

The current invention also defines a flexible set of constructs to work on the dimensioning to allow for dynamic definition of new schema fields, logical relationships between existing and/or new schema fields, mathematical relationships between amongst existing and/or new schema fields, and deterministic ordering of computations allowing for complex analytics in real-time.

The current invention allows descriptive analytics to detect a major trend change in the network, such as realizing a new device has an increased rate of signaling messages at MME or eNodeB signaling RTT is increasing among all users, to trigger an admission control function for certain services of the new device. This provides the ability to implement matching rules to react to changes in the network based on history.

The current invention also allows capturing predictive analytics based on offline hypothesis to foster online training, adaptive behavior and the ability to predict the onset of a state with a high degree of accuracy. This could be used to temporarily trigger allocation of additional resources through 3GPP SON active user load balancing, if it is predicted that radio resources will be saturated. For example, implementing a logistical regression model to train on the attributes that indicate congestion in a sector seconds or minutes before it actually happens and initiate load balancing in the SON network to move idle and active users to neighboring sectors.

To summarize, the current invention proposes a system that provides a holistic view of the network, services, customers and application management in the Mobile Network that is not achieved by prior art and provides a framework and architecture for supporting past, present and future technologies. Prior art provides point solutions that overlap functional areas, such as a network probe tailored for LTE S1/S11 control plane, but does not correlate with other networks. Examples include a DPI box that manages Internet on/off ramp but doesn't understand application behavior at sector level, policy architecture that provides rules for charging but cannot support an analytical model to learn and adapt, NMS that provides network element visibility but is limited to 15-minute visibility in averaged form, or an Offline Analytics that extract deep insight into the network but takes weeks and months to make use of the data. This invention provides an overarching solution that addresses these issues and optimizes all aspects of the Mobile Network.

DETAILED DESCRIPTION

Figure 1:
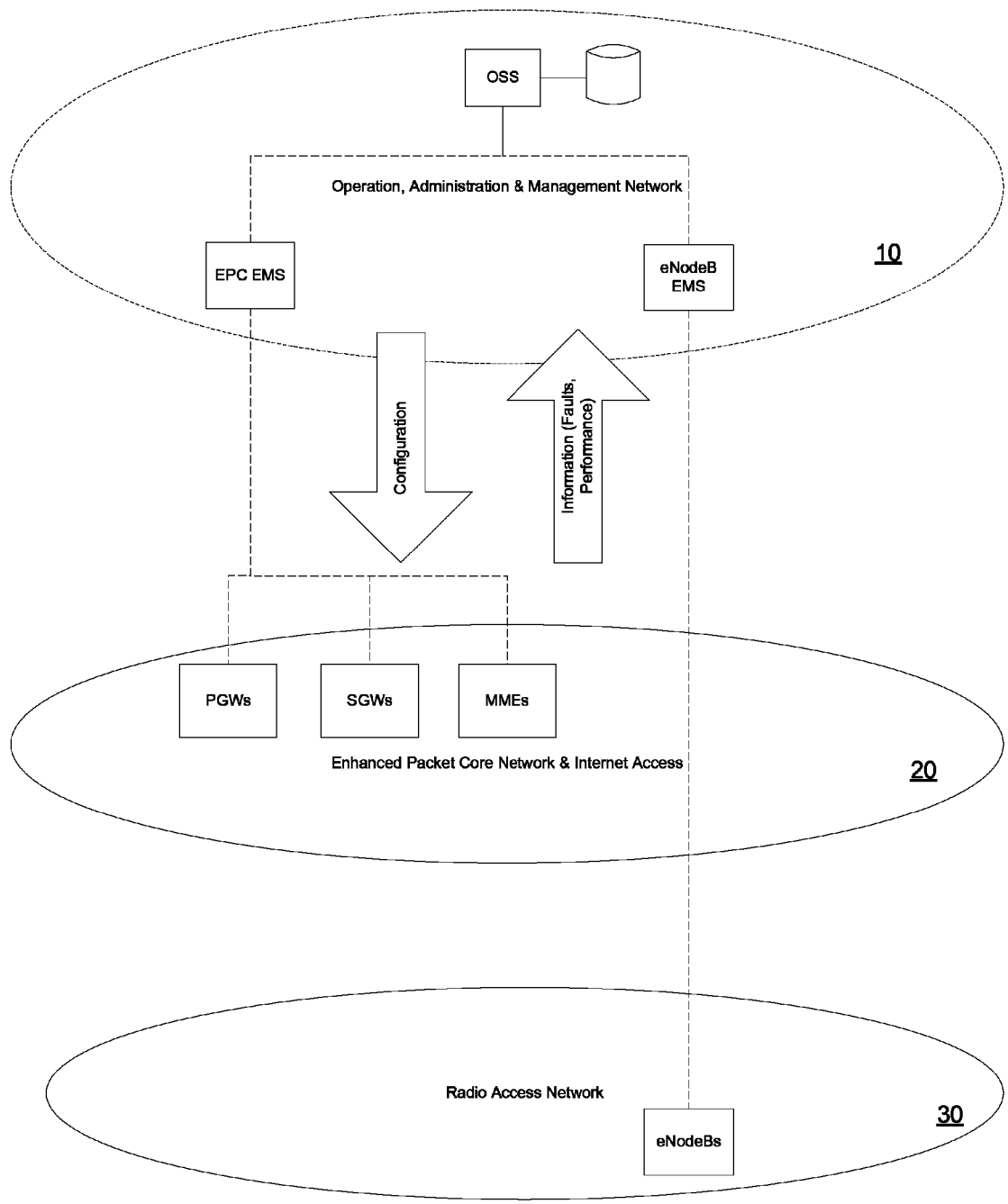
FIG. 1 is an example of prior art for Operational Service System (OSS)/Network Management System (NMS), Element Management Systems (EMSs) relationship with underlying Network Elements (NEs) in a 3GPP LTE network.
Figure 2:
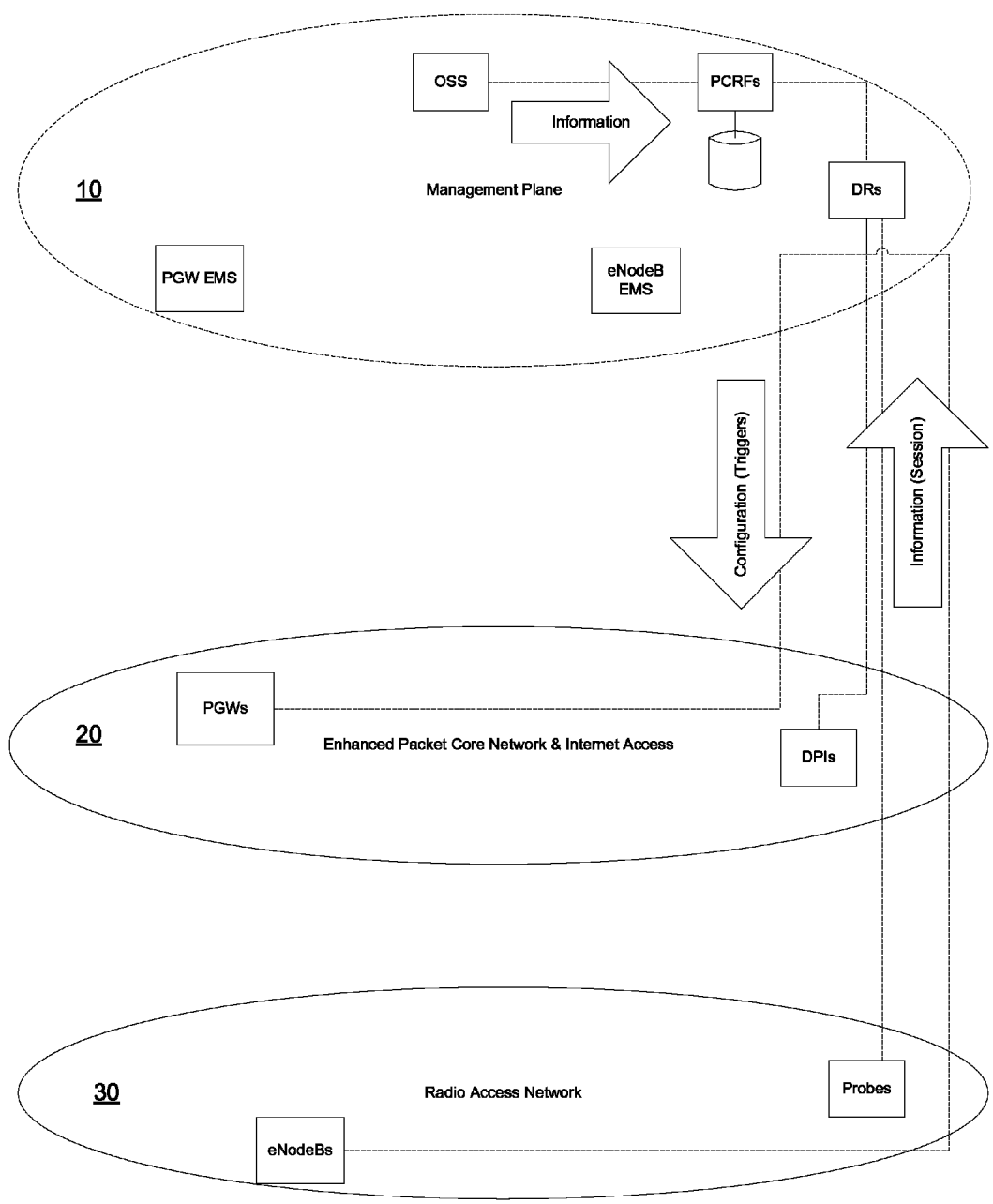
FIG. 2 is an example of prior art of 3GPP Policy Charging Control (PCC) Architecture with underlying Network Elements (NEs) in a 3GPP LTE network.
Figure 3:
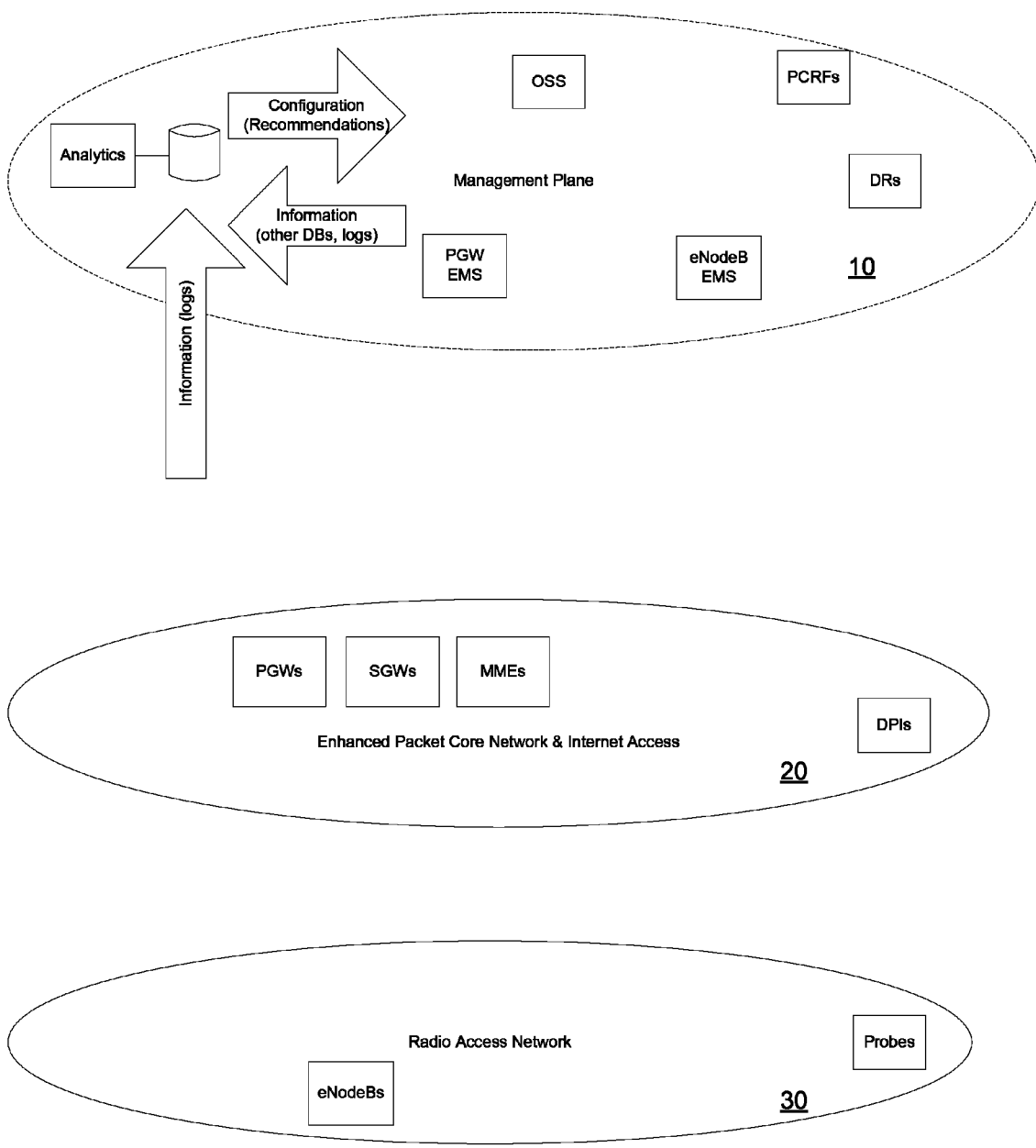
FIG. 3 is an example of prior art of Analytics function with underlying Network Elements (NEs) in a 3GPP LTE network.
Figure 4:
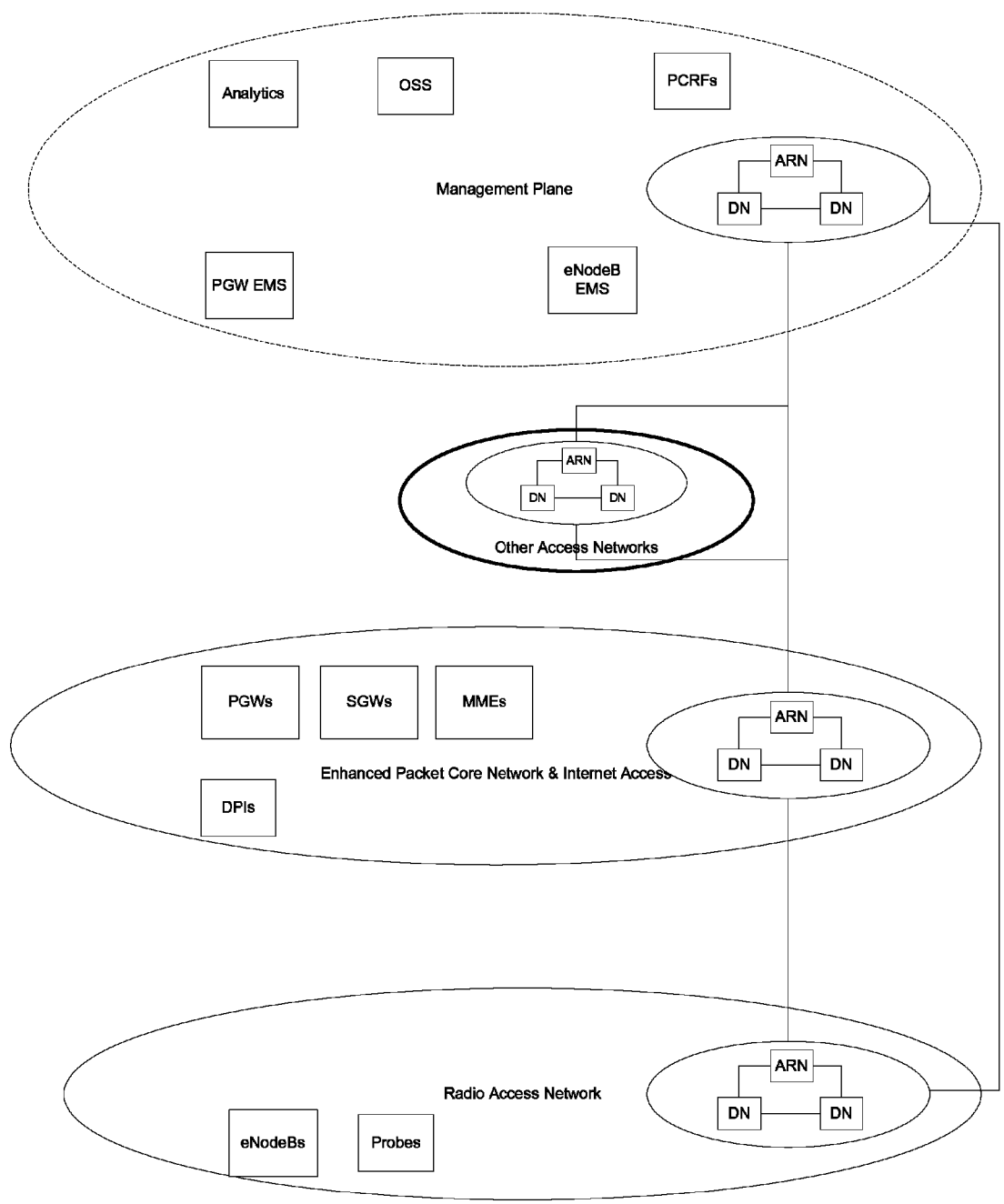
FIG. 4 is an example deployment of a set of DN and ARN across LTE Network and other Access Networks in accordance with the current invention.

FIG. 4 illustrates the current invention exemplifying the process to manage, consolidate and produce descriptive and predictive analytics in a Radio Access Network (RAN) to be used for export or action. U.S. Pat. No. 8,111,630 and U.S. Patent Publication 2013-0021933 define methods and procedure for Content Caching in the Radio Access Network (RAN) in which a network device placed in RAN intercepts Control plane and User Plane protocols, correlates between per user control plane and user plane protocols to extract per user signaling flows, and user plane dataflows. The current invention identifies methods and procedures to retain such information at the point of collection, and presents consolidated and summarized information in an abstract way, so as to minimize the amount of information transferred to plurality of central nodes that collect such information from a number of such devices. Such consolidation and summarization is dynamic and on demand, in the sense that rules for consolidation and retrieval by the central nodes are based on Reports and Analytics of interest. The information collected, consolidated and used by the Reporting and Analytic engines includes data collected in a plurality of Control Planes and User-Planes in one Radio Access Technology, for example, from IUCS control plane, IUCS user plane, IUPS control plane, and IUPS user plane in UMTS network, or in multiple Radio Access Technologies (RATs), such as in Control and User Planes in UMTS Network, and Control & User Planes in CDMA Network.

Additional embodiments of the current invention include:
(1) supplementing the data collected from the monitoring/intercepted data with imported data from external devices such as Service Plane devices, NodeBs/eNodeBs, RNCs, SGSNs/SGWs, GGSNs/PGWs, OSS/EMS, Monitoring Probes, PCRFs/PCEFs, among other devices,
(2) predicting a networking outcome, such as the mobility of users or a network outage based on historical trends and analytics,
(3) root cause identification initiated by threshold crossing alert or KPI anomaly initiating more detailed data collection across Control and User Planes, and correlating with Control plane release codes,
(4) learning data patterns to be used as higher-order correlations, such as Self updating of Type Allocation Code (TAC) database that maps user device identifiers (IMEI) with corresponding manufacturer and device type when unknown IMEs are observed in the control plane, and
(5) distributed on demand consolidation, data reduction, and analytics via an application programming interface (API) based on Analytics/Report needs from higher-order analytics applications where these queries may span a plurality of Data Nodes in RAN.

The current invention identifies 5 categories of RAN Analytics and describes methods and procedures for data collection, consolidation and export for behavior and trending reports or realtime policy control and network optimizations by other ecosystem components in the operator network, or for site optimizations based on RAN conditions. The 5 categories and the specific use cases are:

1. RAN Network Analytics
  a. Peak Hour usage by sector, by time of day
  b. Sector Congestion, SUL Scores for Export and Actions
  c. Sector Usage—usage profile, coverage area profile
  d. CS Usage, PS usage, Multi-RAB, RAB hold times relative to active usage
  e. Trending Reports, and Threshold based Alarms/Triggers
  f. Hourly, Daily, Weekly Reports Core vs RAN latency metrics
  g. Core vs. RAN latency metrics for user plane, control plane, and management plane
2. RAN User Analytics
  a. User access patterns—app type, content types, peak users, frequent users
  b. User QOE in different sectors—SQI for number of users at different times
  c. Mobility patterns of users
  d. Network usage times, frequencies, volumes
  e. Tethering and P2P usage
3. RAN Device Analytics
  a. Device Type Access Pattern—Signaling load, RAB ON/OFF time (inactivity timer)
  b. Release codes, behavior anomalies by device type
4. Site/Publisher Analytics
  a. Site Access pattern by device type: Page Download time, Object download time, idle times during page load.
  b. HTTP error codes, failures
  c. Missed Ads—browser cancels when object download not complete for configured sites
  d. Access trending of content in groups of sectors—certain video-id use increasing in the past 4 hrs, and crossed threshold. Export Trending, and location info to sites.
5. Mobile Application Analytics
  a. Popular application by sectors, regions, and devices
  b. RAN Usage patterns by application that includes data volume, bandwidth usage, frequency of access, amount of signaling load
  c. Content type, popularity, trending, and percent of cancellation The above analytics categories may be combined and cross-correlated between each other.

An additional aspect of the current invention is to run statistical analysis methods on recently collected user-plane and/or control plane, fit statistical models for degradation, such as dropped calls, with failure reason codes and associated independent variables, such as the number of CS Calls, Number of Data sessions, Users with multiple RABs, users with both packet switched, and circuit switched sessions, secondary RABs, relocation failures, sector changes, inter-RAT handovers etc., and predict degradation trends when statistically similar conditions are approaching. These predictions are then used to estimate preventive actions that could be enforced in the device that is analyzing the data, or propagate to external devices such as a PCRF, load balancing device etc., in the mobile operator's network.

FIG. 4 shows the deployment configuration of the nodes that incorporate the current invention. The Data Nodes (DN) collect the data from the RAN transparently. These devices may be deployed as monitoring devices in a physical tap mode or as monitoring devices on mirrored ports from another network device in RAN or as inline devices, as described in U.S. Pat. No. 8,111,630. As such, they may intercept communications between two RAN devices or import logging or protocol digest from other standard and proprietary interfaces associated with other mobile network devices such as eNodeBs, O&M system, Home Location Registration, SON application servers, and probes in the figure.

In all such deployments, Control Plane protocols (CP), or User Plane protocols (UP), or Management Plane protocols (MP), or combination of CP, UP, and MP protocols exchanged between the two RAN devices that are being intercepted are visible to the Data Nodes for deep packet analysis, correlation, analytics, export and report generation.

Figure 5:
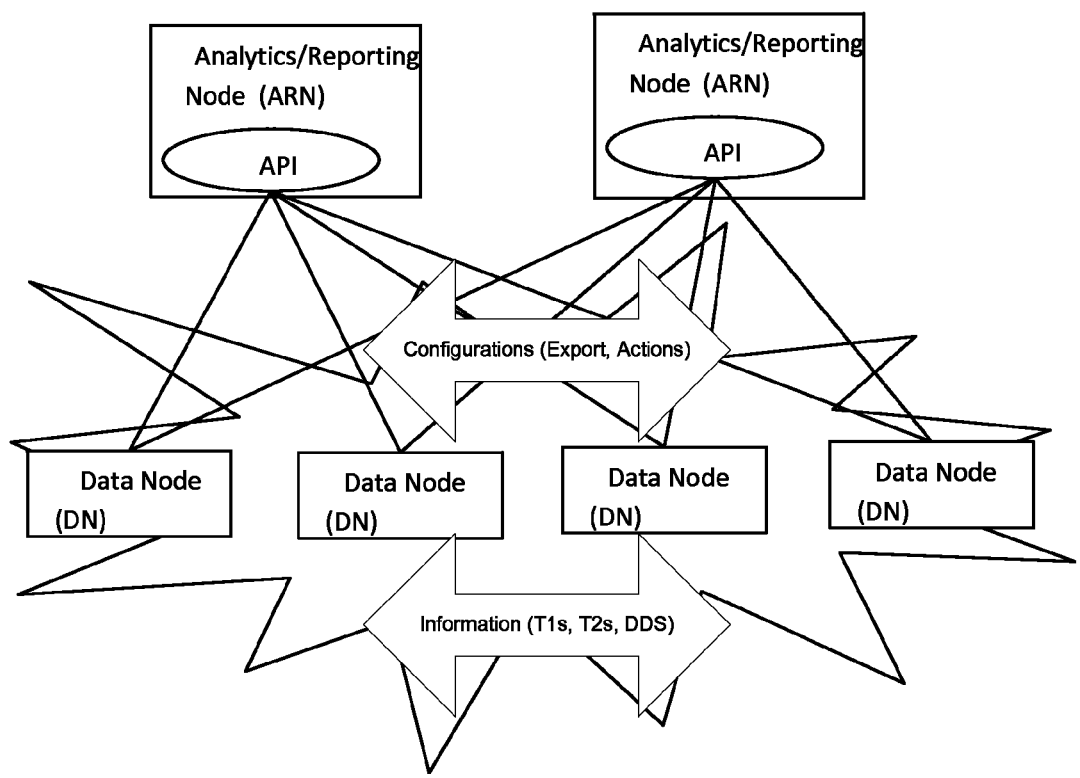
FIG. 5 is the general framework for current invention.

FIG. 5 shows the framework for the current invention. The Analytics/Reporting Nodes (ARN) nodes use an API that includes:
  the type of data sets shown as T1, T2, DDS,
  the attributes within the T1,
  the analysis/consolidation operations to be performed on the selected attributes, and
  the format for transferring results for optimal importing into the ARN database.

Both the DNs and ARNs include processing units, which are in communication with a storage element. The storage element contains instructions, which when executed by the processing unit, allow the particular device to perform the functions described herein.

The current invention proposes APIs which allow a plurality of DNs to export data to ARNs and allows the ARN to request or alter information exported by DNs. The APIs are location and device independent in the sense that the software module which implements the API, generates the requests to one or more DNs depending on the type of dataset, and the type of analytics requested. For example, if usage trends for a specific sector in RAN are needed, this sector will be within the scope of a specific RNC and thus, in the scope of the corresponding DN. If mobility pattern of users from one sector to neighboring sectors is requested by the ARN, this information would be available in more than one DNs. If the access profiles of users for a WebSite are required, this information needs to be gathered from all the DNs. The data reduction, summarization and export methods may be on a dataset that is previously collected and stored (offline analytics), or the data currently being collected or should be collected in future (Realtime analytics). Thus, the operator specifying Analytics/Reports of interest, the ARN mapping to attributes to be collected by DNs, procedures to be performed on the collected attributes before exporting them to ARN, and the format for transferring the consolidated data for efficient import into ARN Database is a closed loop operation.

Stated differently, FIG. 5 illustrates the general flow of operations between ARN and DNs, and the underlying Radio Access Network/Mobile Network in performing various correlation logic for the appropriate RAT. The steps that represent the current invention include 1) ARN communicating the relationship of data elements between protocols and within the same protocol but on different DNs, 2) ARN specifying the type of aggregation function including nominal (e.g. summarization, categorization) and numerical aggregation (average, minimum, maximum, standard deviation, percentiles, counts), 3) ARN specifying the type of formatting required for consolidated reports, 4) ARN specifying the type of control logic required for triggers, 5) DNs creating/maintaining relationships between data elements, 6) DNs aggregating data in nominal or numerical form, 7) DNs generating formatted reports, and 8) DNs generating specified triggers.

Figure 6:
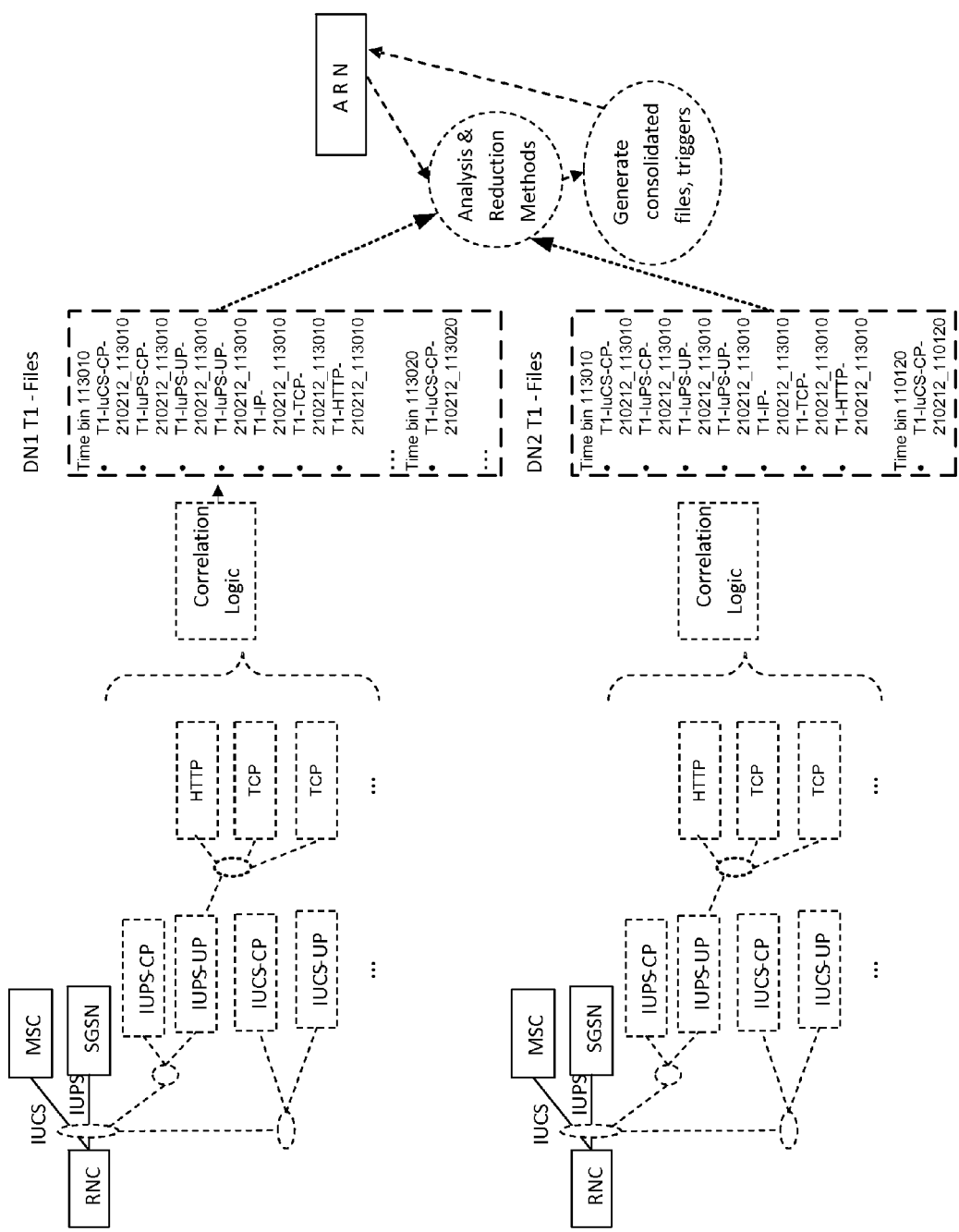
FIG. 6 is an overview of the operation between ARN and multiple DNs.

FIG. 6 is an operational overview of the current invention with in the Data Nodes (DN) and Analytics and Report Node (ARN).

The following sequence of operations outlines the methods and procedures per the current invention.

1. Control Plane and User Plane protocols from the intercepting or Monitored interfaces are correlated as described in U.S. Pat. No. 8,111,630, and commonly owned US Patent Publication Nos. 2013-0021933, 2012-0076120 and 2011-0136488. The correlated information is saved in one or more files in observation buckets; these are termed T1 files in the current invention. For example, control plane information from both CS control plane and PS control for a 10 second period may be saved in a T1 file, named T1_IuCS_CP_02102012_113010 or similar naming convention based on timestamping. Each entry in this file may identify user's IMSI, IMEI, User IP address, Sector ID, and uniqueid that serves to reference entries in other files. Thus, the information recorded may include information from multiple protocols from multiple logical interfaces. For example, other information that is not required, such as transport protocol headers, is not recorded to conserve amount of data saved. Similarly, another T1 file records user plane information for the same time window as T1_IuPS_UP_02102012_11_30. A plurality of T1 files may be saved for each time window based on the type of analytics and reporting needed.

2. Since the above T1 data is generated on network interfaces, the number and size of T1 files saved in the Data node increases depending the volume of data on the interfaces. As the T1 files accumulate, data reduction methods are run with the T1 files as the input, and the Analytic Reports are generated, based on what is needed, as communicated by the ARN. For example, an operators query on ARN may be to get user plane control plane trending analysis for iphones on Sector=532, over the last 24 hours.

3. The API interface software module in the ARN constructs a plurality of requests to the Data Node that is intercepting Sector 532. The information required to generate the report may be in multiple T1 files in a particular data node, such as Data Node D10. The API interface also specifies the format for returning the fields to facilitate importing the result files to the ARN database efficiently.

4. It is envisioned that the ARN defines a set of fixed data reduction and consolidation algorithms based on the set of default trending/analytics it generates, and the ability to extend or refine reduction and consolidation algorithms allow a flexible language across all of the available dimensions in T1s. The ARN user may request additional reports by selecting the attributes of interest. Thus, as the storage space within the Data Node is getting filled up by T1 data files, it executes data reduction methods per previously configured or received ARN requests, retains some window of T1 files (for example for 24 hours) and reclaims the space by discarding T1 files older than 24 Hours. For such discarded files, consolidated information (T2 files) based on the previously received reduction methods is saved.

5. Rather than requesting analytics on previously saved data in a plurality of DNs, the ARN may request consolidated data from information currently being collected within one or more DNs by specifying the T1 files, the corresponding attributes within such files, and the data reduction methods. One such example is a mobility pattern of users from Sector A to Sectors B & C. In this case, the DN should run the data reduction algorithms on the T1 files currently being collected, generate consolidated results (T2 files) and transfer them to ARN in a pipelined fashion. Alternatively the ARN's request could be to generate a trigger when a consolidated attribute, such as number of CS and PS sessions in a sector exceeds an ARN supplied threshold value.

6. The Analytics and Reporting Node (ARN) may supply data reduction methods to the DNs that cover both T1 files (generated at the time data collection), and T2 files that were previously consolidated by previously supplied data reduction methods for import to a database (central or distributed). Supplying the data reduction methods to DNs where data is held reduces the processing requirements in the ARN, reduces transit network bandwidth for transferring the data, and the storage requirements within the ARN. Thus, the current invention includes distributed processing of partially consolidated T1/T2 by constructing the data reduction methods based on user demand, sending it to the DNs and receiving results in a form specified by the ARN based on analytics and reporting needs.

7. Another aspect of the data reduction method in the current invention is dynamic adjustment and tuning of the amount of detail to be reported based on the report requirement sent by the ARN or the user that generates the query. For example, such a query could require detailed information on CP and User plane Sessions, and Multi-RAB activity when the number of CS plane releases with Abnormal Release Codes in a particular sector exceed a specified threshold value. As a diagnostics and troubleshooting aid, information leading to the specified threshold is needed. Since the base network data is contained in the T1 files, for example for the previous 24 Hours period, the ARN could request the DN for detailed report with fine grained attributes within the vicinity of the condition, and more consolidated information beyond the observation window. Thus, this method provides zoomin capability around the ARN specified conditions.

8. In addition to requesting previously collected information (in T1 files) as in (7), the ARN may request additional data collection, for example additional attributes within a protocol. For example, the T1 file that a DN collects for HTTP sessions may only contain downstream content length, and header information for HTTP Responses. Analytics methods in ARN or a user viewing the summarized KPIs in a sector or zone may identify that in a time period the POST method failures are high. Thus the ARN could supply additional procedures to parse HTTP Request header to collect content length in HTTP Request, add additional fields in the corresponding T1 file when the method is post and content length is greater than 5000 bytes. Thus the current invention allows the T1 and T2 data field elements to be added, changed or deleted which allows an easy upgrade path, the ability to provide time series data, and the ability to maintain data structures. Thus, the current invention makes the data collection and analytics a closed-loop system.

9. The data reduction techniques allow dynamically adjustable compaction using multiple key reduction and multiple data element aggregation functions with statistical analysis, nested sorting, anonymizing sensitive data fields and grooming data for accuracy.

10. As stated previously, one aspect of the current invention is self-learning of device type and automatically populating the locally maintained TAC (Type Allocation Code) that identifies mobile device types based on stored TACs. The copending commonly owned US Patent Publication No. 2012-0184258, which is incorporated by reference, identifies a method of identifying mobile device types based on IMEI code communicated in the Control Plane, and user agent header in User plane. This mechanism uses a locally configured TAC database that is either configured manually or imported from an external device. When a mobile device with an IMEI code that is not previously configured in the TAC database, its device type is unknown. The current invention extends this concept by populating the TAC database from the learned information.

11. The device that incorporates the current invention collects the user-plane and control plane data from the interfaces that it is intercepting or monitoring, associates Control plane sessions and the corresponding user-plane sessions as outlined in U.S. Pat. No. 8,111,630. On the user plane data collected, it detects anomalies, such as increased CS Call drops with abnormal cause codes, or signaling connection releases within a given period T, and fits statistical regression models (Logistic Regression) on a variety of collected data so as to determine which usage parameters may be causing the abnormal conditions. One such example is, increased probability of Voice calls when users are accessing both circuit switched and packet switched calls simultaneously, or when users initiate multiple RABS (for example, one RAB for interactive traffic and another RAB for back ground traffic) when a voice call is active, or when there is a change in uplink bandwidth in a sector, downlink bandwidth in a sector, number of CS Sessions, number of packet switched sessions, number of signaling messages, number of handovers, frequent sector changes etc. The prior art performs offline analysis on data collected from network devices. Depending on where this data is collected, the data may not have detailed information to identify per user CS-control-plane, CS-user-plane, PS-Control plane, PS-User plane, and granularity of sectors where the corresponding anomalies are occurring. The current invention identifies the possible causes for such anomalies by running regression analysis on a recent time window of collected data, predicting the onset of such anomalies when similar conditions and controlling the specific causes (for example uplink/downlink bandwidth), or propagating a consolidated set of actions to an external device in the operator network. An example of such action is identifying the cause of an abnormal voice drop as, secondary PDP context when a CS call, and PS session are active, and rejecting establishment of Secondary PDP sessions.

Figure 7:
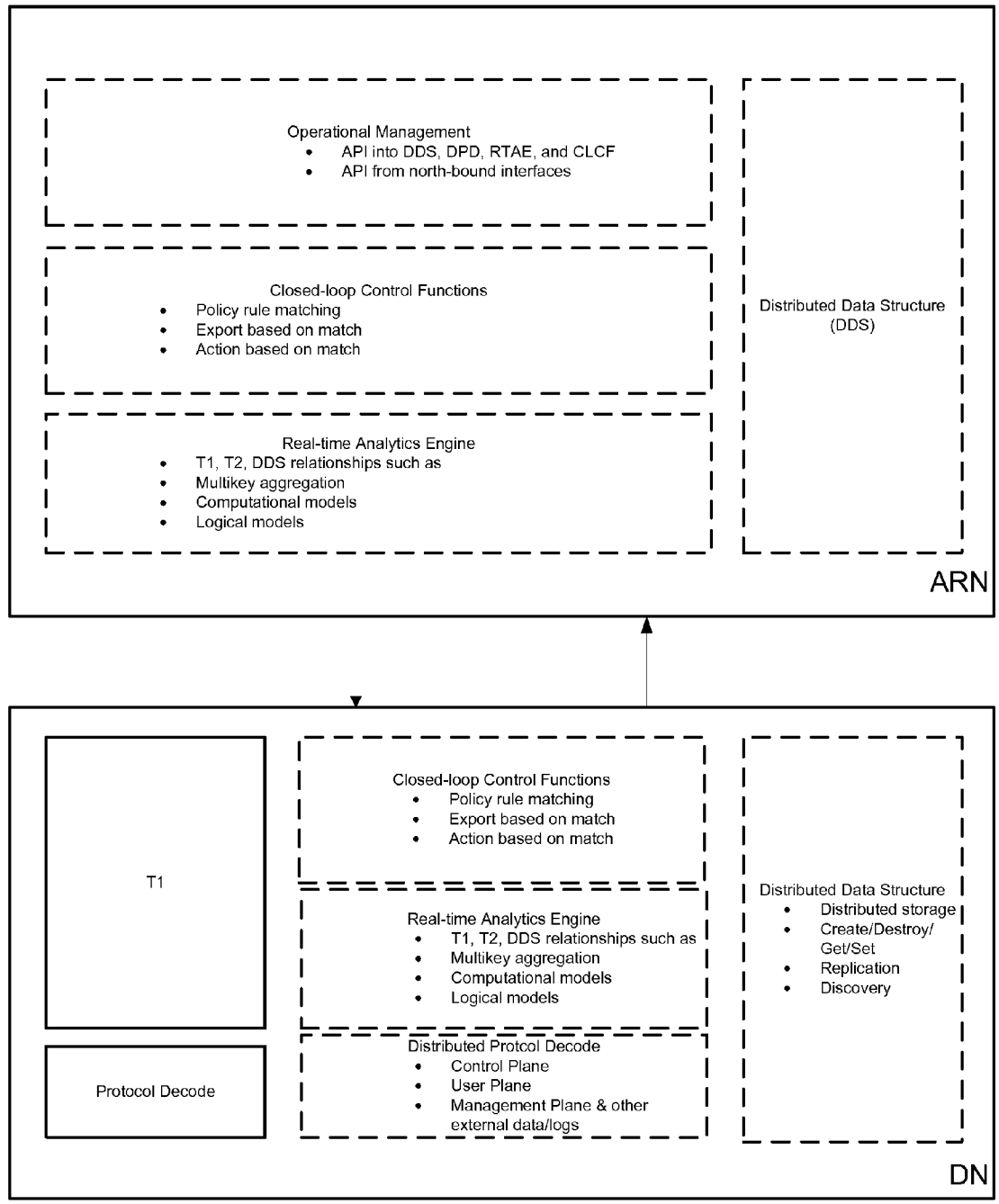
FIG. 7 is a block diagram of main functions of current invention.

FIG. 7 illustrates a block diagram of the current invention that further describes the methods and procedures. Though the diagram illustrates various functions residing in a DN or ARN, this is a logical representation and this can be separated over one or more physical boxes.

The distributed data structure (DDS) is a method by which programmatic data structures may be defined and maintained throughout a plurality of network elements in a Radio Access Network. The distribution allows a collection of network elements (DNs/ARNs) to maintain the complete data structure while no single DN necessarily contains the entirety of the structure. The exact distribution approach may be dependent on the type of structure being maintained and may range from one-to-one to many-to-one relationship with the underlying network elements. A one-to-one relationship assumes a unique key in the data structure is anchored by a primary network element with secondary elements providing backups. In contrast, a many-to-one relationship allows the same key to be updated on multiple nodes, and then summarized only upon collection by an ARN. Aside from the distribution approach, the structures support other basic properties including unique keys, atomicity, multi-tuple, and most importantly low-latency to the degree expected by programmatic system.

Functions performed on the data are specified as part of real-time analytics function (RTAE), but some basic primitives are required for general upkeep including accessibility, notification, and replication. Accessing the data structures is achieved through light-weight inter-processor communication (IPC), which is hidden through an abstract API and allows for getting, setting, and incrementing and decrementing. Notifications of data structure changes are also managed through IPC in a publish/subscriber approach, allowing users to track changes to variables. Replication of data structure is also achieved through IPC.

This concept differs from the prior art in that it provides the flexibility of a distributed database environment, and the low latencies expected from a distributed object model.

Figure 8:
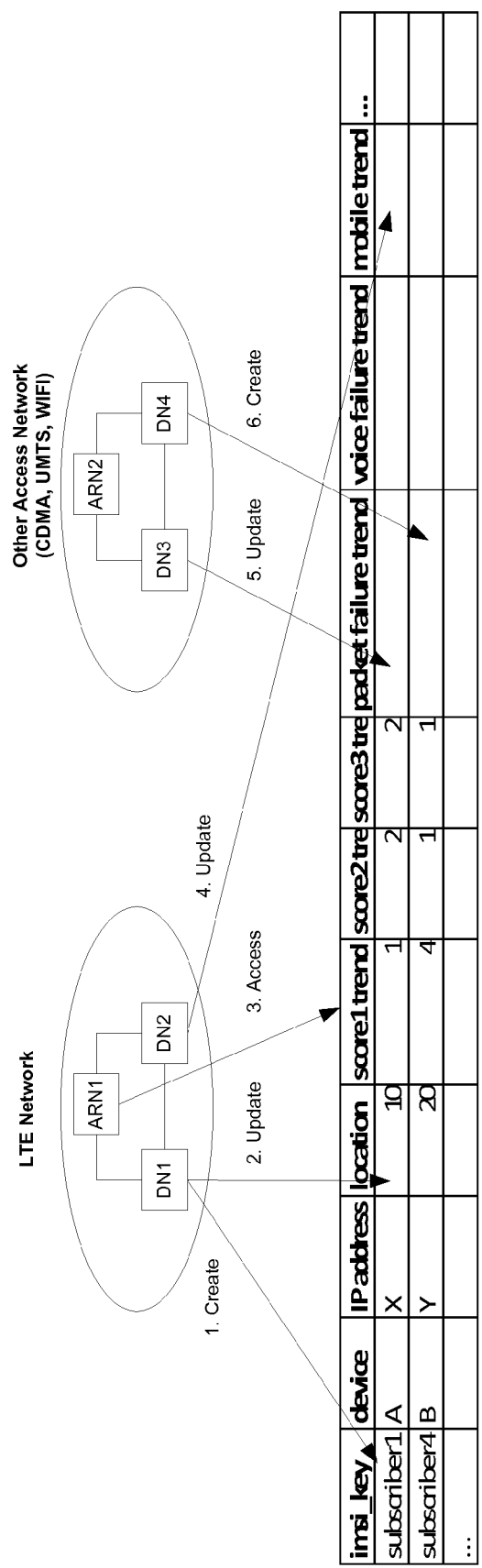
FIG. 8 is a representation of one embodiment of the present invention.

An example of this include defining a subscriber array to maintain the short-term and long-term state of subscriber in terms of active session, RAT, device type, proportion of services used, mobility pattern. FIG. 8 illustrates a set of ARNs and DNs distributed across an LTE network and other access network that share a Virtual Subscriber Base (VSB) utilizing underlying DDS primitives. As subscribers are discovered through decoding in UP/CP/MP at the DNs, the VSB is accessed and updated with various information associated with that subscriber including simple scalar data such as current location, current device, current IP address, past scores (associated with SUL patent), trending across various areas such as mobility, services. The Virtual Subscriber Base is shared among DNs and ARNs, allowing various scenarios.

FIG. 8 describes one scenario where a subscriber, such as subscriber1, is learned in the LTE network and looked up in VSB. Since this subscriber was not found, a new entry is created. Periodically or based on events, DN1 may update subscriber1, for example, if a voice call failure occurred. Other DNs and ARNs may also access data as subscriber1 moves throughout the network, including other access technologies (CDMA, UMTS, WIFI). Other DNs (such as DN2 and DN3) may provide further updates on subscriber1. Other subscribers may also be created, updated and deleted (for example, deleted due to age) based on policies communicated by ARN over the API. The DDS updates are expected to be real-time, allowing programs to utilize the stored data for decisions no less than 1 second granularity.

Figure 9:
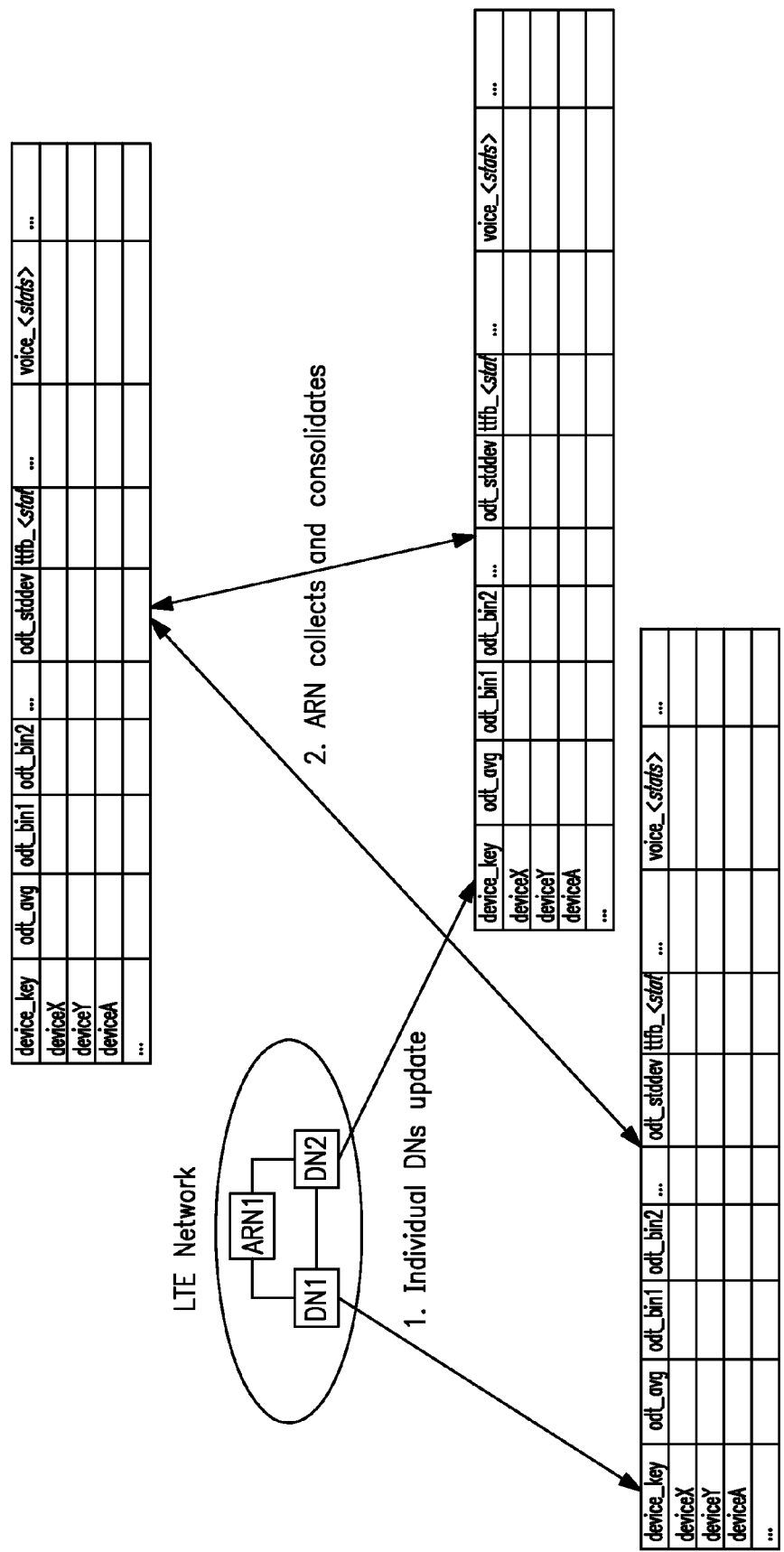
FIG. 9 is a representation of a second embodiment of the present invention.

Another example of DDS is to consolidate statistics with dynamic schemas. FIG. 9 provides an example where multiple DNs are directed by an ARN to maintain device level statistics by capturing averaging, minimum, maximum, distributions, etc across a series of performance indicators such as object download time, time-to-first-byte of TCP session, voice call failures, etc. This data is 1) updated on a periodic basis, and 2) consolidated on a periodic or on demand basis. The requests may be requested from a higher level function.

Another example use case is collecting per user access profile when the user is moving from one sector to another. For example, a user starts accessing Web, which generates DNS Request, and TCP connection, and then user device moves to a different sector, which is in the scope of another DN. The user access profile may be used to reconstruct the data-flow of user protocol sequence (tcp state, http state) within the new sector so that it is synchronized (time sequence) and correlated with old sector information for the same IMSI.

Other embodiments of this include:
Calculation of simple statistics associated across various nominal data dimensions such as domain statistics, content type statistics, service plane statistics, location statistics, and other information of a nominal nature which can be reduced.
Calculation of real-time aggregate KPIs as defined in co-pending patent (R2) such as SUL, SMI, SSUL.

The distributed protocol decoder (DPD) is a method by which network state is reconstituted by interpreting any combination of control plane, user plane, management plane and external data sources across a plurality of network elements, potentially geographically distributed and maintaining synchronization of state information using DDS primitives. In order to maintain or reconstitute network state the distributed decoder implements synchronization to the protocol, synchronization across protocols down to sub-second granularity, identify the necessary keys associated with network state correlating across protocols, and chain sequences of protocol exchanges.

An example of this is implementing subscriber learning by tapping into geographical dispersed network elements to learn the entire network state of a session (e.g. device, location, QCI). There are several reasons for distributed collection, such as, (1) in certain operator deployments, a logical interface such as S1AP, S1U, etc., from a network element such as e-NodeB may be split to multiple interfaces, for example 2 MMEs, or 2 SGWs for load balancing and high-availability reasons such that CP/UP traffic for one sector or eNodeB could only be determined by correlating and identifying traffic for 1 sector from multiple interfaces, (2) certain interfaces may not be available for monitoring/interception at a specific location, for example S1AP, and S1U interfaces may be available at eNodeB, S11 interface traffic is not available at eNB, (3) Due to user mobility, part of the user traffic may be available in DN1 associated with eNB1, and the remaining available in DN2 associated with eNB 10; thus deriving per user session metrics requires summarization or anchoring session of a specific user from multiple DNs, (4) the processing and storage capacities required for a number of users or a number of Sectors, eNBs etc, may not be sufficient for a single DN, thus requiring multiple DNs and distributing collected and correlated data or presenting an aggregate API that presents consolidated view to ARN irrespective of the number of DNs.

The real-time analytics function (RTAE) is a procedural engine that utilizes unstructured, structured and consolidated data views provide by T1s, T2s, and DDS along with a series of exposed APIs for performing necessary summarization and correlation functions. Functions include the ability to create new DDS through a combination of T1s, T2s, and other DDS created using various downloadable functions for assurance of synchronization/updating, complex math relationships and algorithms to achieve analytics. Ordering of execution of various functions is maintained through programmatic scripts that ensure variables are defined before used. Periodic running of functions is managed by event updates, or periodic work associated with the defined function.

The RTAE engine coupled with an API enables various analytics techniques, such as implementing scoring, binning, sampling, decision trees, clustering algorithms, partitioning, transformations, market basket analysis.

Other RTAE embodiments include the following:
1. Decision tree models that allow the relationship between attributes to be defined as a consolidated metric, such as user's access to the network is bad either when RAB setup sessions fail or when RAB Setups succeed and data throughput is below configured value for that technology and user application.
2. Market basket analysis processing may be used to determine the mobility of users within a RAT (e.g. LTE) or between RATs (LTE/CDMA, LTE/Wifi, etc) by monitoring hand-overs, hand-ups, and hand-downs to determine most common points of hand-off. This would allow the inferences that users that are in this sector most commonly move to a certain sector.
3. Real-time Text processing to find root of word for categorization purposes. Examples include:
    a. HTTP User agent string parsing which might be used to determine a class of devices are running the same embedded operating system version, or
    b. HTTP URL string parsing for categorization, determining interaction.
4. Regression models may be used to continuously train and adapt for predictions such as training on variables/conditions that are predictors for a drop call in a HSPA.
5. Associate UP/CP/MP data with mapping/correlation tables that are used to categorize/summarize. Examples include:
    a. Mapping of TCP/UDP ports or HTTP as a transport to applications to understand which interactions are associated with a type of application that has certain traffic patterns and traffic management needs such as email, video, voice, chat.
    b. Mapping particular cells/regions (LTE, CDMA, HSPA, WiFi, WiMAX) with specific characteristics such as 850 Mhz vs. 1900 Mhz GSM spectrum to characteristics with RF design such as building penetration.
    c. A combination of text processing and categorization. For example, using cause codes descriptions for control plane Radio Access Bearer (RAB) setups to categorize different cause codes into similar categories. For example, different Access technologies may have different cause code values, and a session drop or bad session could occur in a RAT for multiple reasons—consolidating cause codes from Multiple RATs to a common category and subclass, for example, due to user mobility or sector congestion, provides overall network score.

d. Supervised models such as decision tree, neural network or regression analysis, etc.
e. Unsupervised models such as clustering analysis, correlation analysis, etc.

All of the above examples may be implemented across one or more DNs and ARNs, may be combined and sequenced to build larger analysis through the API between the ARN and the DN. In this way, DNs may share information between each other or through ARNs.

The close-loop control functions (CLCF) is a procedural engine that provides the ability to trigger a series of DDS, DPD, and RTAE methods through API or with Export, as described in co-pending U.S. Patent Publication No. 2013-0021933, to provide closed-loop operations on systems that are internal and external to the DN/ARN. The closed loop function is a structure of rules which may be fired based on conditions of the underlying DDS. The CLCF may reside on the DN or ARN, depending on the scope of the underlying DDS.

An example of this is updating SON configurations across a series of eNodeBs based on a prediction of increased load on the system. An example of a closed loop control function which may be achieved is as follows:
1. The goal of the operator is to predict when areas of a network will become overloaded and introduce actions to mitigate the overload situation via OSS configuration, User optimization and/or using 3GPP standard actions configurations (SON, PCRF, ANDSF) to move the right users in the right locations.
2. Operator begins by configuring, via the ARN, several attributes to score a sector load, score individuals within a sector in terms of mobility, score individuals within a sector in terms of application preferences, as described in co-pending U.S. Patent Publication No. 2013-0021933.
3. Operator further introduces a prediction model for network overload to determine particular T1/T2 attributes that have a strong correlation to the onset of sector load which may include number of users, CP/UP/MP load, or network failure indications.
4. Operator provisions an action to be taken, such as sending an email with a report for the network overload scenarios and the types of users that are in the area of the network based on Step #2.
5. Operator performs offline analysis over hours/days and adjusts the prediction model, which may be further extended to include combinations of supervised models
6. After some iterations, the operator deploys the network overload prediction model with appropriate actions to be taken for example:
a. if a sector is expected to be overloaded, initiate 3GPP SON load balancing to move subscribers to nearby sectors,
b. if several sectors are overloaded, perform a combination of 3GPP SON on edge and DPI user optimization at another area of the network,
c. if entire network is overloaded, initiate 3GPP ANDSF to other RATs in combination with other actions The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An enhanced Radio Access Network (RAN), comprising:
a plurality of data collection nodes, each disposed so as to intercept communications between adjacent components disposed in said RAN, wherein said communications comprise multiple protocols from multiple logical interfaces, and wherein the data collection nodes correlate and consolidate information received in the intercepted communications by associating control plane sessions and the corresponding user plane sessions; and
one or more analysis and reporting nodes (ARNs), in communication with each of said data collection nodes, wherein said ARNs transmit requests for information to said data collection nodes, wherein said requests comprises a set of attributes of interest, a data reduction method, and a format in which said information should be delivered to said ARN, and where said data reduction method comprises analysis and consolidation algorithms to be performed by said data collection nodes on the attributes of interest,
wherein said data collection nodes continuously intercept communications and store said communications in one or more first files and said data reduction method is performed on said one or more first files by said data collection node to create one or more second files, and
wherein said second files are stored in said data collection node and said request from said ARN further comprises a second data reduction method to be used for previously generated second files, such that newly created third files and previously stored second files are delivered to said ARNs.

2. The enhanced RAN of claim 1, wherein said attributes of interest are selected from the group consisting of RAN network analytics, RAN user analytics, RAN device analytics, site/publisher analytics, and mobile application analytics.

3. A method of collecting analytics about a Radio Access Network (RAN), comprising:
disposing a plurality of data collection nodes in said RAN, where each is configured to intercept communications between adjacent components in said RAN and to correlate and consolidate information received in the intercepted communications by associating control plane sessions and the corresponding user plane sessions;
collecting said communications in one or more first files in said data collection nodes, wherein said collected communications comprise multiple protocols from multiple logical interfaces;
transmitting a request for information to said data collection nodes, wherein said request comprises a set of attributes of interest, a data reduction method and a format in which said information should be delivered to an analysis and reporting node (ARN), where said data reduction method comprises analysis and consolidation algorithms to be performed by said data collection nodes on the attributes of interest;
consolidating said first files into second files, using said data reduction method;
storing said second files in said data collection node;

transmitting said second files from said data collection node to said ARN in said requested format;

receiving a second request for information from said ARN, said request comprising a second set of attributes of interest, a second data reduction method, and a second format in which said information should be delivered to said ARN;

applying said second data reduction method to said second files to create third files;

consolidating said first files into second files using said second data reduction method; and transmitting said second files and said third files from said data collection node to said ARN in said requested second format.

4. The method of claim 3, wherein said requests are generated using an application programming interface (API).

5. The method of claim 3, wherein said first files are automatically consolidated into second files using a data reduction method previously received from said ARN.

6. The method of claim 5, wherein said consolidating is performed to save storage space in said data collection nodes.

7. The method of claim 3, comprising supplementing said second files with imported data from external devices.

8. The method of claim 7, wherein said external devices comprise service plane devices.

* * * * *